Nov. 23, 1954
D. W. SHERWOOD ET AL
2,695,214
METHOD OF MAKING METALLIC OXYFLUORIDES
Filed Oct. 11, 1945
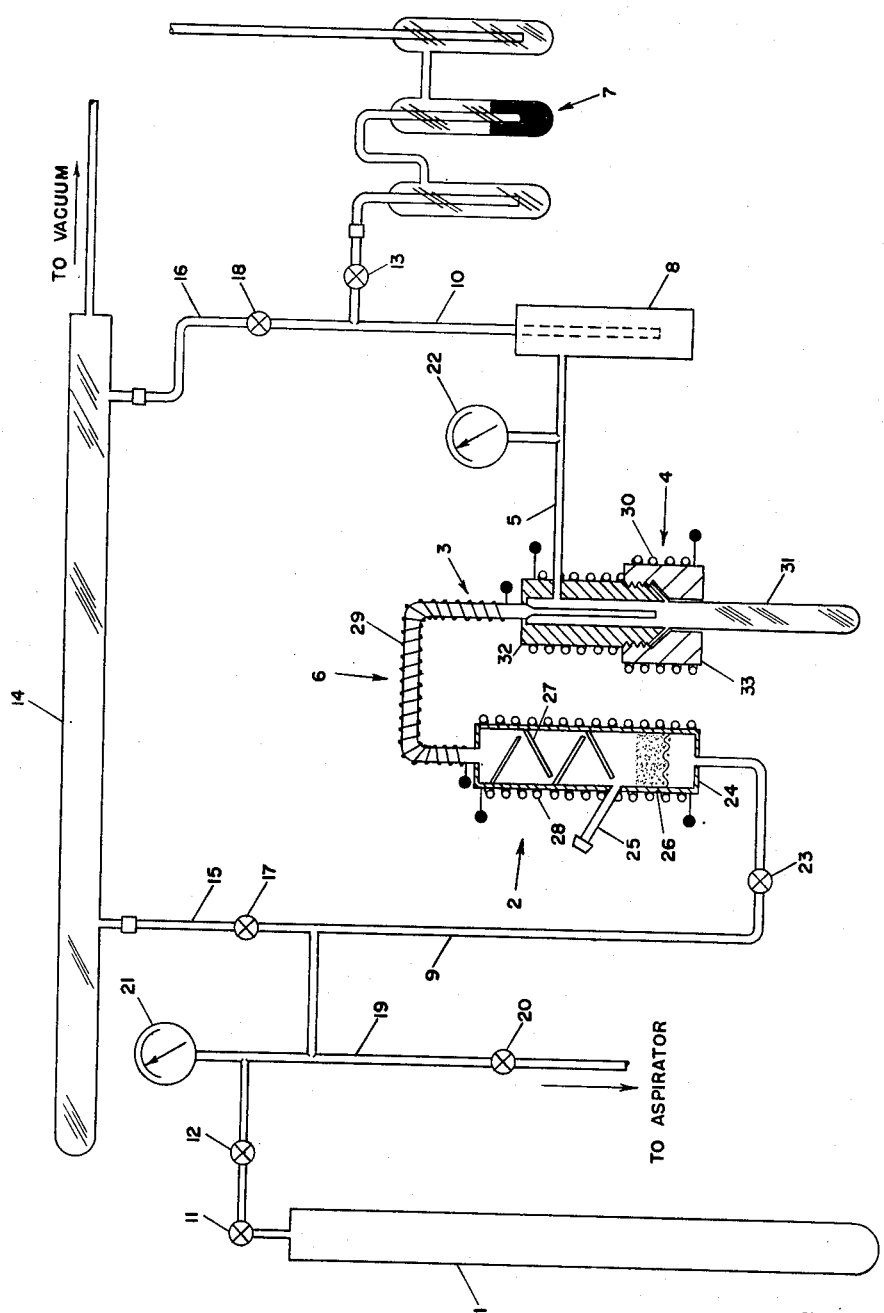
INVENTOR.
GREGORY C. BANIKIOTES
DONNELLE W. SHERWOOD
BY

United States Patent Office 2,695,214
Patented Nov. 23, 1954

2,695,214

METHOD OF MAKING METALLIC OXYFLUORIDES

Donnelle W. Sherwood, Leonia, N. J., and Gregory C. Banikiotes, Brooklyn, N. Y., assignors to the United States of America as represented by the United States Atomic Energy Commission Application October 11, 1945, Serial No. 621,852

8 Claims. (Cl. 23—88)

This invention relates to a method of making metallic oxyfluorides in general and to a method of making certain valuable oxyfluorides in particular.

The use of certain oxyfluorides such as an oxyfluoride of tungsten, $WOF_4$, and an oxyfluoride of molybdenum, $MoOF_4$, has been proposed in connection with an isotope exchange reaction for the production of uranium compounds enriched in the uranium isotope of atomic weight 235.

It is therefore an object of the present invention to devise an efficient method of making these oxyfluorides and metallic oxyfluorides in general.

According to the present invention a general method has been found for the preparation of metallic oxyfluorides which involves the treatment of a metal oxide with fluorine. Many metals form a series of oxides in which the metal exists at various levels of oxidation, the highest oxide frequently being a more common form. The method of the present invention may involve the treatment of the highest oxide of a metal with fluorine, or alternatively the treatment of a lower oxide with fluorine. In the event that a metal is capable of forming more than one oxyfluoride, it is within the scope of the invention to prepare a particular, desired oxyfluoride. In general, a particular, desired oxyfluoride may be made by properly coordinating the selection of the metal oxide with the selection of the reaction conditions, particularly the temperature. As illustrative of oxyfluorides which may be prepared by the method of the present invention, an oxyfluoride of tungsten, $WOF_4$, and an oxyfluoride of molybdenum, $MoOF_4$, may be prepared. More specifically, said oxyfluoride of tungsten may be prepared by treating tungsten trioxide with fluorine, preferably at a temperature in the range of 230° C. to 400° C. This reaction may be conveniently carried out by means of a continuous flow system in which fluorine is continuously passed over solid tungsten trioxide at a temperature in the range indicated, a gaseous mixture containing said oxyfluoride is continuously withdrawn from unreacted trioxide, the oxyfluoride is continuously condensed from the gaseous mixture and the depleted gas in continuously removed from the condensed oxyfluoride.

The invention will be described with particular reference to the production of $WOF_4$ and with reference to the accompanying drawing which illustrates apparatus useful for its production by a continuous flow system and useful for the production of oxyfluorides in general whenever a continuous flow system may be employed.

Referring to the drawing the apparatus comprises, in general, a fluorine gas tank supply means 1, a reaction chamber 2, a condenser 3 adapted to receive gaseous reaction products and to liquefy the oxyfluoride therefrom, a receiver 4 adapted to receive the liquid oxyfluoride and the depleted gas and which functions also as a condenser to solidify the liquid oxyfluoride and to permit the removal of the depleted gas, a conduit 5 for the removal of the depleted gas, a heating unit 6 for maintaining parts of the apparatus at suitable temperatures, a moisture blocking unit 7 and an auxiliary element 8 therefor. The gas supply means 1 is connected to the reaction chamber 2 by a conduit 9. The element 8 is connected to the unit 7 by a conduit 10. The gas supply means 1 is provided with tank valves 11 and 12 for regulating the flow of gas to the reaction chamber. A valve 13 is included in the conduit 10 for isolating part of the apparatus from the atmosphere. Means are provided for evacuating air from the apparatus prior to use and may comprise a manifold 14 connected to a pump (not shown) and provided with pipes 15 and 16 which open into the conduits 9 and 10 respectively. Valves 17 and 18 are included in the pipes 15 and 16 respectively for isolating the rest of the apparatus from the evacuating means. Means are also provided for evacuating fluorine from the apparatus at the end of the reaction and may comprise a pipe 19 connected to an aspirator (not shown) and connected to open into the conduit 9. A valve 20 is included in the pipe 19 for isolating the rest of the apparatus from the fluorine evacuating means. A compound gauge 21 is included at a point in the conduit 9 to measure either gas pressure or vacuum depending on conditions existing in the apparatus and a similar gauge 22 is included at a point in the conduit 5. A valve 23 is provided in the conduit 9 as an additional means for regulating the flow of fluorine to the reaction chamber. The reaction chamber may comprise a cylinder 24 provided with a capped side arm 25 which may be opened for the purpose of inserting the metal oxide preferably in powder form; a porous wire screen 26 supported horizontally in the reaction chamber at the lower end thereof for accommodating the powder; and a number of baffles 27 at the upper end for preventing the powder from drifting out of the reaction chamber. The heating unit 6 preferably may comprise a heating coil 28 for heating the reaction chamber to the reaction temperature, a heating coil 29 for heating a portion of the condenser 3 adjacent the reaction chamber to a somewhat lower temperature, and a heating coil 30 for heating the delivery end of the condenser 3 and an adjacent portion of the receiver 4 to a still lower temperature at which the oxyfluoride is a liquid. The receiver 4 may comprise a tube 31, a closure member 32 and a clamp 33 to seal the latter to the tube. The member 32 is provided with openings to receive the delivery end of the condenser 3 and one end of the conduit 5, these elements terminating in the heated zone of the receiver in which the oxyfluoride is a liquid to ensure continuous flow of oxyfluoride to the tube 31 and continuous removal of the depleted gas. The unit 7 and the element 8 together may comprise a plurality of gas bubblers in series, connected at one end to the conduit 5 and open at the other end to the atmosphere. An element of the unit 7 may contain a fluorocarbon oil which blocks the entry of atmospheric moisture to the rest of the apparatus, the remaining elements serving to catch any overflow of fluorocarbon.

The apparatus may be made principally of a metal such as copper or nickel. Preferably the manifold 14 is of glass and the unit 7 and the tube 31 of a transparent plastic material resistant to fluorine, the latter to permit observation of the condensation of the oxyfluoride and hence of the progress of the reaction.

In order to prepare $WOF_4$, a quantity of tungsten trioxide is inserted in the arm 25 and received on the screen 26. With valves 11, 12, 13 and 20 closed, and valves 17, 18 and 23 open, air is evacuated from the apparatus. Valves 17 and 18 are then closed and a flow of fluorine gas through the system is started by adjusting valves 11 and 12. When the fluorine gas pressure in the system reaches about one atmosphere, as determined by the gauges 21 and 22, valve 13 is opened to the atmosphere. The reaction chamber 2 is then heated by means of heating coil 28 to maintain a temperature of about 245° C. throughout the reaction. A portion of the condenser 3 adjacent the reaction tube is heated by means of the heating coil 29 to maintain a temperature which preferably is intermediate between the temperature of the reaction chamber and the temperature at which tungsten oxyfluoride liquefies (187.5° C.). The delivery end of the condenser 3 and the adjacent end of the receiver 4 are heated by means of the heating coil 30 to maintain a temperature between 120° C. and 130° C. During the progress of the reaction a gaseous mixture which contains tungsten oxyfluoride and fluorine passes out from the reaction chamber and into the condenser 3. At the delivery end of the condenser 3, tungsten oxyfluoride is liquefied and drops to the bottom of the tube 31 maintained at room temperature where it solidifies. Gas depleted in tungsten oxyfluoride passes out of the member 32 through conduit 5, element 8, conduit 10 and unit 7 to the atmosphere.

When it appears that the reaction has ceased, valves 11, 12 and 13 are closed and valve 20 is opened. Fluorine is then aspirated from the system. The receiver 4 contains tungsten oxyfluoride in good yield and high purity.

Employing a similar apparatus and technique, an oxyfluoride of molybdenum, $MoOF_4$ may be prepared by treating molybdenum trioxide with fluorine, preferably at a temperature in the range of 400° C. to 625° C.

The embodiments described may be varied without departing from the scope of the invention. To prepare $WOF_4$ and $MoOF_4$ the lower oxides may be treated with fluorine provided that suitable reaction conditions are employed. The continuous flow system described is a convenient way of carrying out the reaction, whenever applicable, but is not essential. If used, it may be modified. For example, instead of continuously condensing the oxyfluoride from the gaseous reaction products the latter may be completely collected and condensation then carried out. Instead of condensing the oxyfluoride from the gaseous reaction products, other methods of separation may be used.

Since many embodiments might be made of the present invention and since many changes might be made in the embodiment described, it is to be understood that the foregoing description is to be interpreted as illustrative only and not in a limiting sense.

We claim:

1. The method of making tungsten oxyfluoride having the composition $WOF_4$ which comprises reacting tungsten trioxide with fluorine and recovering said oxyfluoride.

2. The method of making a tungsten oxyfluoride which comprises reacting tungsten trioxide with fluorine at a temperature in the range of 230° C. to 400° C. and recovering $WOF_4$.

3. The method of making a tungsten oxyfluoride which comprises reacting tungsten trioxide with fluorine at about 245° C. and recovering $WOF_4$.

4. The method of making a tungsten oxyfluoride which comprises continuously passing fluorine over tungsten trioxide at a temperature in the range of 230° C. to 400° C. and continuously removing a gaseous mixture containing $WOF_4$ from unreacted trioxide.

5. The method of making a tungsten oxyfluoride which comprises continuously passing fluorine over tungsten trioxide at a temperature in the range of 230° C. to 400° C., continuously removing a gaseous mixture containing $WOF_4$ from unreacted trioxide and separating said oxyfluoride from said gaseous mixture.

6. The method of making a tungsten oxyfluoride which comprises continuously passing fluorine over tungsten trioxide at a temperature in the range of 230° C. to 400° C., continuously removing a gaseous mixture containing $WOF_4$ from unreacted trioxide and condensing said oxyfluoride from said gaseous mixture.

7. The method of making a tungsten oxyfluoride which comprises continuously passing fluorine over tungsten trioxide at a temperature in the range of 230° C. to 400° C., continuously removing a gaseous mixture containing $WOF_4$ from unreacted trioxide, continuously condensing said oxyfluoride from said gaseous mixture and continuously removing depleted gas from the condensed oxyfluoride.

8. The method of making a tungsten oxyfluoride which comprises continuously passing fluorine over tungsten trioxide at a temperature in the range of 230° C. to 400° C., continuously removing a gaseous mixture containing $WOF_4$ from unreacted trioxide, continuously passing said gaseous mixture into a temperature zone in which the oxyfluoride condenses as a liquid therefrom, continuously passing the liquid oxyfluoride into another temperature zone in which the oxyfluoride condenses to a solid and continuously removing the depleted gas from said first-mentioned temperature zone.

References Cited in the file of this patent

J. W. Mellor's "A Comprehensive Treatise on Inorganic and Theoretical Chemistry," vol. 11, 1931 Ed., page 611, Longmans, Green and Co., N. Y.

Sears et al., Journal of the American Chemical Society, vol. 57, pages 794–6 (1935).